Jan. 8, 1935.  G. T. PFLEGER  1,987,157
BEARING STRUCTURE
Filed Oct. 20, 1930   2 Sheets-Sheet 1

INVENTOR
George T. Pfleger
BY John Flam
ATTORNEY

Patented Jan. 8, 1935

1,987,157

UNITED STATES PATENT OFFICE 1,987,157

BEARING STRUCTURE

George T. Pfleger, Los Angeles, Calif., assignor to U. S. Electrical Manufacturing Company, Los Angeles, Calif., a corporation of California Application October 20, 1930, Serial No. 489,913

1 Claim. (Cl. 308—168)

This invention relates to a bearing and especially to one that is arranged to provide a lubricant to a vertical submerged shaft that is supported by the bearing. Such an arrangement is especially advantageous in connection with deep well pumps that are lowered into the bore, and that must keep operating in a liquid medium such as water, surrounding the pump and under pressure. Such pumps are operated with the shaft substantially vertical, making its lubrication difficult.

It is one of the objects of my invention to provide a bearing that can withstand the conditions of service attendant upon such uses, and to provide effective lubrication for the shaft.

I accomplish this object by interposing between the shaft and the bearing, a layer of lubricant kept in the desired place due to the relative weight of the lubricant and the water in which the pump operates.

My invention possesses many other advantages, and has other objects which may be made more easily apparent from a consideration of a few embodiments of my invention. For this purpose I have shown several forms in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claim.

Referring to the drawings.

Figure 1:
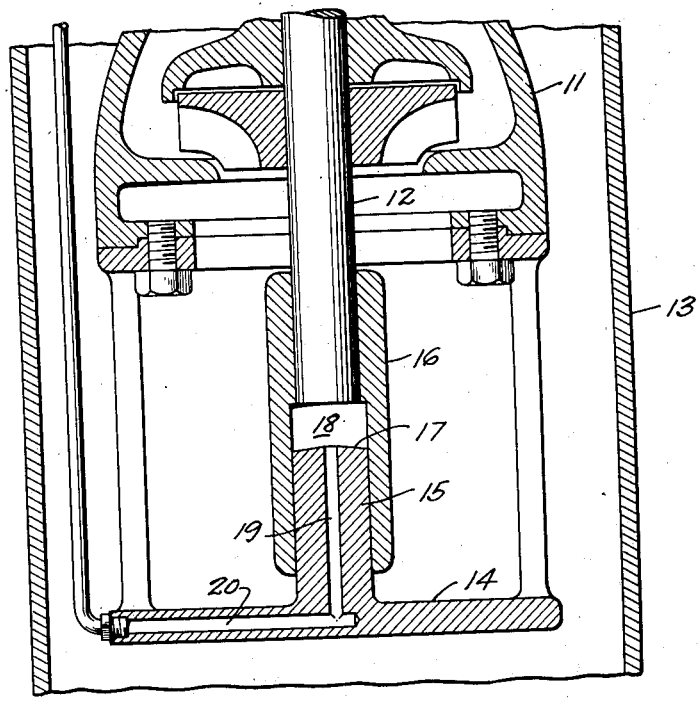
Figure 1 is a sectional view of a bearing structure embodying my invention.

In Fig. 1, there is shown the lower portion of a vertical pump 11 having a vertical shaft 12 and located inside a casing 13 of an oil well. It is of course understood that the pump 11 is suspended inside the well, which is filled with fluid, such as water, to be carried out by the pump 11. Attached to the casing of the pump is an extension or frame 14, carrying a central boss 15 telescoping into a sleeve 16. This sleeve is fastened to the end of shaft 12 and extends beyond it, so as to provide a socket for the boss 15, and over which it has a running fit.

The top 17 of boss 15 is shown as placed below the end of shaft 12 so as to leave a space or chamber 18 defined by these two parts and sleeve 16. Thus an inverted cup is formed by the shaft 12 and sleeve 16. The bearing between boss 15 and sleeve 16 is kept lubricated by a flow of lubricant into chamber 18. Ingress can be effected as by the passageways 19, 20, leading to a source of lubricant which may be under sufficient pressure to produce this circulatory action; but the lubricant or oil being lighter than the water to be pumped, will rise of itself into the inverted cup. The egress of the oil of course is effected through the very narrow space between the periphery of boss 15 and sleeve 16, and into the oil well casing 13. There is thus a circulation that furnishes a stream of lubricant past the bearing surfaces and into the liquid that is to be pumped.

Figure 2:
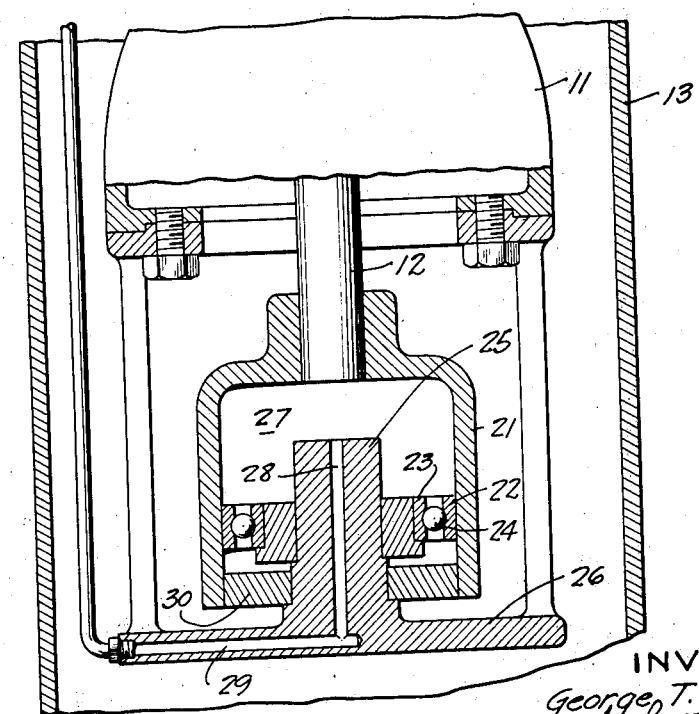
Figs. 2 and 3 illustrate modifications thereof.

In the modification shown in Fig. 2, a ball bearing arrangement is provided. Shaft 12 carries the housing 21 inside of which is carried one part 22 of a ball race. This part cooperates with a ring 23 to hold the ball bearings 24. Ring 23 is supported on the central boss 25 of frame 26. A space 27 is defined by housing 21 around and above the boss 25, which has the oil or lubricating passageways 28, 29 for the supply of lubricant; thus this space 27 can be termed an inverted cup. The lubricant finds its way out into casing 13, through the narrow space defined between the flange 30 fastened to boss 25, and the inner surface of housing 21.

Figure 3:
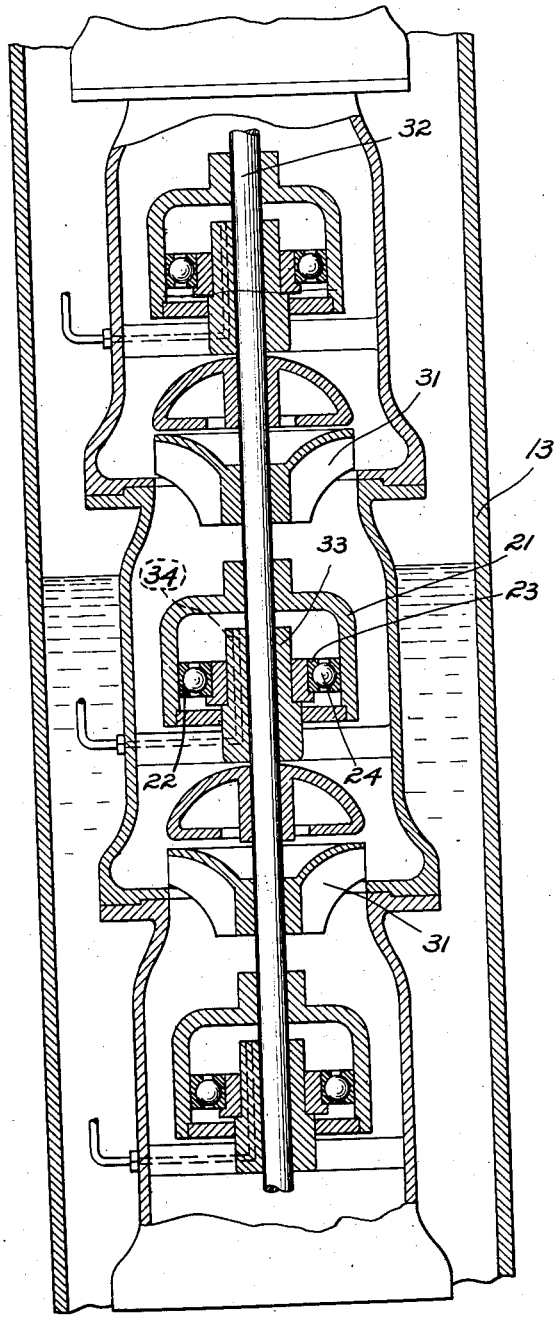

In Fig. 3, a form of the invention is shown wherein intermediate bearings can be lubricated in the same manner as the lower bearings such as shown in Figs. 1 and 2.

In this case, a series of pump impellers 31 are shown, all connected to a shaft 32, and provided with bearings both above and below each impeller. Each bearing can include an inverted cup 21 fastened to the shaft and carrying the outer ball race 22. The stationary race 23 is held on a central stationary stub or sleeve 33 surrounding shaft 32 and extending into the cup 21. An oil passage 34, equivalent to the passage 28 of Fig. 2, can be provided through this stub or sleeve, which of course encompasses shaft 32 loosely.

In all forms, all foreign matter is excluded by the outflow of oil through the bearing.

I claim:

In a vertical bearing structure for a shaft, capable of being submerged in a fluid heavier than the lubricant used for the structure, a stationary member having a flange and a vertical projection extending above the flange, said projection and flange having an aperture through which the shaft extends, an inverted cup carried by the shaft, the sides and top of the cup being spaced from the projection to form respectively an annular space, and a chamber above the projection, the lower portion of the sides of the cup being telescoped over the edge of the flange to define therewith a narrow egress for lubricant, a bearing interposed in the annular space between the cup and the projection, and means for supplying a lubricant under pressure into said spaces.

GEORGE T. PFLEGER.